United States Patent Office 2,958,358
Patented Nov. 1, 1960

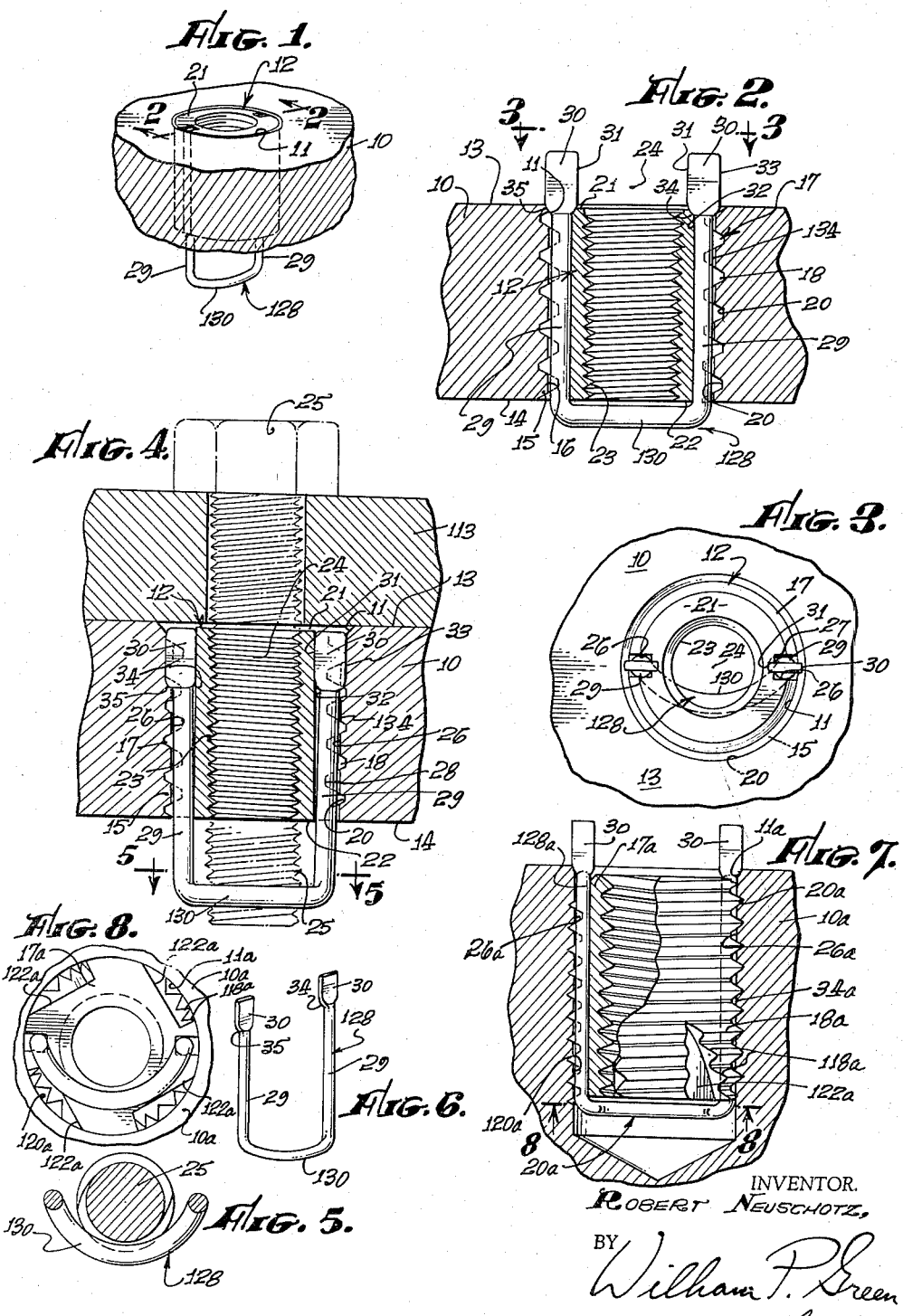

2,958,358

THREADED ELEMENT WITH U-SHAPED LOCKING KEY

Robert Neuschotz, 1162 Angelo Drive, Beverly Hills, Calif.

Filed Mar. 13, 1958, Ser. No. 721,136

18 Claims. (Cl. 151—23)

This invention relates to threaded elements, and particularly to improved means for locking a pair of interengageable threaded elements against detachment. The invention is in certain respects particularly adapted for securing a threaded insert or stud within a recess or opening in a member to which the insert or stud is to be connected.

A major object of the invention is to provide a lockable threaded unit of this type which is so designed that it can be used in sizes which are much smaller in diameter than is possible with most similar devices. Another object is to design a unit of this type which can be produced at very small cost, and yet will provide a completely satisfactory locking action. In addition, a unit built in accordance with the present invention is especially adapted to be very easily released from its locked condition when desired. Also, in instances in which the threaded part takes the form of a threaded insert into which a bolt can be connected, the locking element may be constructed to serve a secondary function of yieldingly locking the bolt in the insert.

To achieve the above results, I utilize a unique type of locking key which is carried by the associated insert, stud, or other threaded element, and which is adapted to be driven axially relative to the threaded element to effect a locking action. The key is of U-shaped configuration having a pair of generally parallel arms extending essentially axially within a pair of grooves formed in the threaded element. These grooves extend essentially axially through the threads of the threaded element, at generally opposite locations. The cross piece of the U-shaped key joins together the two arms at their axially inner ends, and may be yieldingly engageable against a coacting bolt (where the threaded element is a threaded insert) in a manner to lock the bolt in the insert.

After the threaded element has been screwed into full engagement with the threads of a second member, the key is driven axially by force exerted against the outer ends of the two arms of the key, which arms are suitably exposed for this driving action. Toward these outer ends of the arms, at least one of the arms has a portion which functions, upon such axial driving, to dig into and deform the threads of the second member, to thus effect the desired locking action. This portion may also be designed to act as a stop member while the two parts are being screwed together, for limiting the extent to which the threaded parts are initially screwed together. At least one of the arms may also have its axially outer end so shaped as to provide a shoulder which is engageable with the threaded element by which the key is initially carried and in a relation preventing detachment of these parts before being engaged with the second threaded member.

The above and other features and objects of the present invention will be better understood from the following detailed description of the typical embodiments illustrated in the accompanying drawings, in which:

Fig. 1 is a perspective view showing an insert assembly constructed in accordance with the invention, and connected into a threaded opening in an associated carrier member;

Fig. 2 is an enlarged axial diametrical section taken on line 2—2 of Fig. 1;

Fig. 3 is a top plan view taken on line 3—3 of Fig. 2;

Fig. 4 is a view corresponding to Fig. 2, but showing the insert assembly after it has been locked in its assembled position within the outer member;

Fig. 5 is a transverse section taken on line 5—5 of Fig. 4;

Fig. 6 is a perspective view showing only the locking key of the insert assembly, Fig. 7 is a partially sectional view showing a variational form of the invention; and Fig. 8 is a bottom view of the Fig. 7 device, taken essentially on line 8—8 of Fig. 7, but with the locking element shown in elevation.

In the drawings, I have shown at 10 a member containing an opening 11 into which a threaded insert assembly 12 is to be connected. The member 10 may typically be a part formed of aluminum or other relatively soft metal, and in the particular case illustrated in the drawings, the opening 11 extends entirely through member 10, from its upper surface 13 to the lower parallel surface 14. It will be apparent, however, that the opening 11 may instead be a blind or closed recess, if desired, rather than the illustrated opening. The wall of opening or recess 11 is internally threaded at 15, with these threads being truncated so that their minor diameter is at the location designated 16 in Fig. 2.

The insert assembly 12 includes a rigid essentially tubular insert body 17, having external threads 18 corresponding to and adapted to threadedly engage the internal threads 15 of outer body 10. The external threads 18 of element 17 project radially outwardly into the deepest portions of the grooves 20 formed between threads 15 of member 10, to form an effective threaded connection with member 10. The insert element 17 may have an axial extent corresponding substantially to the axial thickness of member 10, and element 17 may terminate at its opposite ends in a pair of parallel oppositely directed end faces 21 and 22 which may be approximately aligned with surfaces 13 and 14 of member 10 in the ultimate assembly. Internally, insert 17 contains threads 23 which may be finer or coarser threads than the external threads 18, and which are centered about the same axis 24 as are threads 17. As seen in Fig. 4, the internal threads 23 are adapted to threadedly receive an externally threaded stud or bolt 25, to thus connect the stud 25 to member 10 by means of the insert 17.

At two diametrically opposite locations, the outer surface of threaded insert 17 contains a pair of parallel grooves 26, which may extend directly axially of insert 17. These grooves 26 typically may have the rectangular cross section illustrated in Fig. 3, and extend into the material of insert 17 to a depth 27 which may be a substantial distance radially inwardly of the deepest portions of grooves 28 between threads 18 of insert 17. This, of course, means that the inner extremity 27 of each of the grooves 26 is spaced an even greater distance inwardly of the innermost portions 16 of the truncated threads 15. The grooves 26 extend along the outer surface of insert 17 for its entire axial length, and the grooves desirably have the Fig. 3 rectangular configuration along their entire extent.

For locking insert 17 within opening 11 of member 10, I utilize a novel type of locking key 128, which initially has the essentially U-shaped configuration represented in Fig. 2. More specifically, this key 128 has two parallel arms 29 extending axially of insert 17 and within the two grooves 26 respectively of that insert. At their lower or axially inner ends, the two arms 29 are interconnected by a transverse cross piece portion 130 of the U-shaped key 128. At their upper or axially outer ends, the two parallel arms 29 have a pair of radially enlarged portions 30. The key 128 may be formed of a single continuous piece of wire, which may be of uniform transverse cross section along its entire length, except at the location of the two extremities 30. This wire, and therefore the arms 29 and cross piece 130 of the key 128, may typically be of circular cross section, as shown, although it is possible in some instances to utilize a wire of other cross sectional configurations. The diameter or radial extent of the arms 29 is small enough to allow reception of arms 29 within grooves 26, and at locations to be received entirely radially inwardly of the minor diameter 16 of threads 15 of member 10. Preferably, the arms 29 are of a thickness radially of the insert to occupy substantially the entire radial distance between the inner walls 27 of grooves 26 and the minor diameter 16 of threads 15. Thus, with arms 29 received in grooves 26 in the position of Fig. 2, the insert 17 can be screwed into threads 15 and to the Fig. 2 position without any interference being offered by arms 29.

The two axially outer extremities 30 of arms 29 may be deformed to their illustrated radially enlarged condition by merely flattening the upper ends of arms 29 in essentially a diametrical plane with respect to axis 24, so that each of the extremities 30 projects radially inwardly at 31 a substantial distance inwardly of the inner surface 32 of the main portion of the associated arm 29; and also so that the outer portion 33 of each enlargement 30 projects radially outwardly beyond the outer surface 134 of the main portion of the associated arm 29. The inwardly projecting portion 31 of each enlargement 30 causes the formation of a shoulder 34 on the enlargement which is engageable against the end surface 21 of insert 17 to limit the initial inward axial movement of key 128 relative to insert 17. In this way the key 128 is held against accidental detachment from insert 17 during handling of the device prior to its insertion into opening 11 of member 10. It also should be noted that the key 128 is desirably formed of a resilient spring material, which normally tends by its own resilience to urge arms 29 toward one another and to more closely spaced positions than in Fig. 2, to thus cause arms 29 to closely engage the inner walls 27 of grooves 26, and in that way assure proper engagement of the shoulder 34 with the end 21 of insert 17 in order to prevent accidental separation of the parts.

The key 128 should be formed of a relatively hard material, preferably a hard spring steel, and for this purpose a conventional music wire may be used. Insert element 17 is normally of a somewhat softer material, such as carbon steel, but is itself considerably harder in most cases than the main outer body 10. The shoulder 34 is preferably of the illustrated curving or tapering configuration, and a similar outer shoulder 35 formed by each of the enlargements 30 is also desirably of a curving or tapering configuration. It is further noted that the increased diameter 33 to which enlargement 30 projects is substantially greater than the minor diameter 16 of threads 15 in member 10.

To describe the manner of use of the above discussed insert assembly, assume first that the insert body 17 has not yet been screwed into opening 11 in member 10, and that the U-shaped key 128 is carried by insert 17 in the relation shown in Fig. 2. That is, the two arms 29 of key 128 are received within grooves 26 of insert 17, with enlargements 30 holding the key against movement in one axial direction, and with the cross piece 130 holding the key against axial movement in the other axial direction. A user may then grasp the assembly 17—128 by means of the two outwardly projecting enlargements 30, that is, holding these two enlargements 30 between his fingers, and the insert assembly may then be screwed into opening 11 and to the Fig. 2 completely inserted position, by manipulation of projections 30. As will be apparent, these two off-center projections function as ideal lugs for manually screwing the insert into body 10. After the insert assembly is in the Fig. 2 position, the user may drive key 128 axially inwardly relative to parts 10 and 17, by means of a hammer or any other suitable driving or pressing tool, and to the Fig. 4 locked position. During such driving movement, the projections 30 act to engage and cut into or deform the threads 15 of member 10 at two diametrically opposite locations, so that these enlargements 30 will thereafter function as keying parts, for effectively locking insert 17 against rotation relative to member 10. That is, the cutting of enlargements 30 into the threads acts to form shoulders in the threads which abut against the opposite sides of enlargements 30, and thus provide the desired locking action. During the initial axial movement, shoulders 34 at the inner sides of enlargements 30 engage the end surface 21 of insert 17, to cam the arms 29 and enlargements 30 radially outwardly a short distance (see Fig. 4), to thus maximize the locking effect. This radially outward movement may to a certain extent cause the main reduced diameter portions 29 of the arms to themselves dig a short distance into the material of threads 15, to in this way add to the locking action attained by enlargements 30. As seen in Fig. 4, the radial extents of enlargements 30 are desirably such as to bring the outermost portion 33 of each enlargement 30 to a diameter corresponding approximately to the major diameter of threads 15, in the ultimate completely assembled condition of the apparatus.

After the insert assembly 17—128 has been connected into member 10 to the Fig. 4 position, the stud or screw 25 may be screwed into insert 17, as shown in broken lines in Fig. 4, typically to bolt a plate 113 to part 10. Though the cross piece 130 may if desired be straight, and extend directly diametrically, it preferably is so shaped as to engage screw 25 in a manner providing a self-locking action, releasably securing the screw against unscrewing movement from the insert. For this purpose, the cross piece 130 may be given the curved normal configuration shown in Fig. 3, so that it curves arcuately to a side of axis 24 in extending between the two arms 29. The extent of this curvature is such that the cross piece 130 will be in the path of a side portion of screw 25 as the screw advances into and beyond insert 17, but with the cross piece 130 being so rounded and shaped as to be deflectible laterally by the inner end of screw 25, so that by the time screw 25 has reached the Fig. 4 position, cross piece 130 is bearing tightly against a side of the screw. The resilience of cross piece 130 and arms 29 will cause the cross piece to bear yieldingly against the screw with sufficient force to frictionally hold the screw in any desired set position, but of course permitting removal of the screw if sufficient excessive force is applied. Fig. 5 shows the position to which cross piece 130 is deformed when engaged by screw 25. As will be apparent, the natural rounded external shape of the wire from which cross piece 130 is formed will cause the outer surface of cross piece 130 to function as a camming surface, so that the inner end of the screw will automatically deflect cross piece 130 from the Fig. 3 position to the Fig. 4 position as desired.

Figs. 7 and 8 show a variational form of the invention, which is essentially the same as that of Figs. 1–6, except that the element 17a is a self threading or tapping type of insert, which itself automatically forms the threads 20a in member 10a as the insert is screwed into position. To attain this purpose, the inner end of element 17a is cut away, as illustrated, at several circularly spaced locations 122a, to form thread shaped cutting edges 118a at the leading ends of certain portions of the threads 18a. As part 17a and its locking element 128a are screwed into the initially cylindrical and unthreaded bore 120a, the cutting edges 118a automatically form threads 20a, into which the threads 18a of part 17a then progressively advance to form a tight threaded connection.

In Figs. 7 and 8, the opening 120a is typically shown as a blind or closed recess, rather than as a through opening of the Figs. 1–6 type. The Figs. 7 and 8 device is locked by axial driving of locking part 128a, in the same manner that the Figs. 1–6 device is locked.

I claim:

1. An assembly adapted to be connected into a recess formed in an outer member, comprising an element having external threads adapted to be screwed into threaded engagement with said member in said recess, said element having two grooves extending essentially axially along its outer surface at two opposite sides of the element and extending through said external threads, and a generally U-shaped locking key carried by said element having two arms extending essentially axially within said two grooves respectively and having a cross piece joining the axially inner ends of said arms, the portions of said arms which are received in said grooves at the thread locations being thin enough radially to allow screwing of the assembly into said recess while the arms are in said grooves, said arms having their axially outer ends exposed so that a tool may engage said outer ends and drive the key essentially axially inwardly relative to said element and to a locking position after said element and the carried key have been screwed into said recess, at least one of said arms having a locking portion near its axially outer end projecting radially outwardly farther than an axially adjacent portion of that arm and adapted to engage and deform the threads of the outer member as a result of said axial driving of the U-shaped key along said grooves to thereby positively lock said element in said recess.

2. An assembly as recited in claim 1, in which each of said arms has one of said locking portions near its axially outer end projecting radially outwardly farther than an axially adjacent portion of the arm and adapted to engage and deform the threads of the outer member upon said axial driving to lock the element in said recess.

3. An assembly as recited in claim 1, in which said locking key is formed of resilient spring material.

4. An assembly as recited in claim 1, in which said locking portion of said one arm forms a shoulder positioned to engage axially inwardly against said outer member as said element is screwed into said member and to thereby limit said inward screwing movement of the element.

5. An assembly as recited in claim 1, in which said element is a threaded insert having internal threads into which a coacting screw is connectible.

6. An assembly as recited in claim 1, in which said element is a threaded insert having internal threads into which a coacting screw is connectible, said cross piece of the key being shaped to engage a side of said screw in a relation tending to frictionally lock said screw in the insert.

7. An assembly as recited in claim 1, in which said element is a threaded insert having internal threads into which a coacting screw is connectible, said key being formed of resilient spring material, and said cross piece thereof being bent to extend partially about said screw and yieldingly engage and bear against a side thereof in a relation tending to frictionally lock said screw in the insert.

8. An assembly as recited in claim 1, in which the portions of said arms which are received within said grooves during screwing of the element into said recess are thin enough radially to be entirely received within the minor diameter of said threads of the outer member.

9. The combination including the assembly recited in claim 1, in combination with and screwed into said outer member, and with said key in said locking position and driven into and deforming the threads of the outer member.

10. The combination as recited in claim 9, in which said element is a threaded insert having internal threads, said combination including a screw connected into said insert and laterally engaged and frictionally held in the insert by said cross piece of said key.

11. The combination as recited in claim 9, in which both of said arms have said locking portions at their outer ends.

12. An assembly comprising an element having threads adapted to threadedly engage a coacting member, said element containing two grooves extending essentially axially through said threads at opposite sides of the element, and a generally U-shaped locking key carried by said element having two arms extending essentially axially within said two grooves respectively and having a cross piece joining the axially inner ends of said arms, the portions of said arms which are received in said grooves at the thread locations being thin enough radially to allow screwing of said element and said member together while said arms are received in said grooves, said arms having their axially outer ends exposed so that a tool may engage said outer ends and drive the key essentially axially inwardly relative to said element and to a locking position after said threads of the element have been engaged with the threads of said member, and at least one of said arms having a locking portion near its axially outer end projecting radially beyond an axially adjacent portion of that arm and to a position in which said locking portion will engage and deform the threads of said coacting member as a result of said axial driving of the U-shaped key to thereby positively lock said element against detachment from said member.

13. An assembly as recited in claim 12, in which at least one of said arms has a shoulder near said axially outer end thereof engageable with said element to limit axially inward movement of the key relative to said element prior to said driving of the key.

14. An assembly as recited in claim 1, in which said element has a self tapping axially inner portion adapted to cut mating threads in said outer member as the element is screwed into said recess.

15. An assembly adapted to be connected into a recess formed in an outer member, comprising an element having external threads adapted to be screwed into threaded engagement with said member in said recess, said element having two grooves extending essentially axially along its outer surface at two opposite sides of the element and extending through said external threads, and a generally U-shaped locking key carried by said element having two arms extending essentially axially within said two grooves respectively and having a cross piece joining the axially inner ends of said arms, said cross piece being engageable axially outwardly against said element to retain the key against axially outward separation from said element, the portions of said arms which are received in said grooves at the thread locations being thin enough radially to allow screwing of the assembly into said recess while the arms are in said grooves, said arms having axially outer ends which project axially outwardly beyond said grooves and are exposed so that a tool may engage said outer ends and drive the key essentially axially inwardly relative to said element and to a locking position after said element and the carried key have been screwed into said recess, at least one of said arms forming a locking portion near its axially outer end projecting radially outwardly farther than the adjacent portion of that arm axially inwardly of said locking portion and adapted to engage and deform the threads of the outer member as a result of said axial driving of the U-shaped key along said grooves to thereby positively lock said element in said recess, and at least one of said arms having a shoulder at its radially inner side and near said axially outer end thereof and engageable axially inwardly against said element to limit axially inward movement of the key relative to said element prior to said inward driving of the key.

16. An assembly adapted to be connected into a recess formed in an outer member, comprising an insert having internal threads into which a coacting screw is connectible and having external threads adapted to be screwed into threaded engagement with said member in said recess, said insert having two grooves extending essentially axially along its outer surface at two opposite sides of the insert and extending through said external threads, and a generally U-shaped locking key carried by said insert having two arms extending essentially axially within said two grooves respectively and having a cross piece joining the axially inner ends of said arms, said cross piece being engageable axially outwardly against said insert in a relation retaining the key against axially outward separation from the insert, said arms having radially enlarged locking portions near their axially outer ends projecting axially outwardly beyond said grooves, said axially outer ends of the arms being exposed so that a tool may engage said outer ends and drive the key essentially axially inwardly relative to said insert and to a locking position after said insert and the carried key have been screwed into said recess, said enlarged locking portions of the two arms projecting radially outwardly to form first shoulders adapted to engage and deform the threads of said outer member as a result of said axial driving of the U-shaped key to thereby positively lock said element in said recess, said locking portions of the arms also projecting radially inwardly to form second shoulders at their radially inner sides engageable axially inwardly against said insert to limit the axially inward movement of the key relative to the insert prior to said driving of the key, and said arms having intermediate portions in the grooves at the thread locations and axially between the locations of said cross piece and said locking portions and having a radial thickness which is sufficiently smaller than said locking portions to permit said screwing of the assembly into said recess while the arms are in said grooves.

17. An assembly as recited in claim 16, in which said second shoulders are shaped to cam the arms radially outwardly a short distance as a result of said driving action.

18. An assembly as recited in claim 16, in which said key is formed of resilient spring wire, said cross piece being shaped to extend about and engage one side of said screw and to yieldingly bear against the screw to lock the screw in the insert.

References Cited in the file of this patent

UNITED STATES PATENTS

| | | |
|---|---|---|
| 85,381 | Hamilton | Dec. 29, 1868 |
| 336,710 | Freeman | Feb. 23, 1886 |
| 929,532 | Armstrong | July 27, 1909 |
| 1,017,770 | Latshaw | Feb. 20, 1912 |
| 2,783,811 | Cummaro | Mar. 5, 1957 |
| 2,855,970 | Neuschotz | Oct. 14, 1958 |